(12) United States Patent
Waschura et al.

(10) Patent No.: US 7,606,297 B2
(45) Date of Patent: Oct. 20, 2009

(54) METHOD AND SYSTEM FOR CREATING AN EYE DIAGRAM USING A BINARY DATA BIT DECISION MECHANISM

(75) Inventors: Thomas Eugene Waschura, Menlo Park, CA (US); Andrei Poskatcheev, Menlo Park, CA (US)

(73) Assignee: SyntheSys Research, Inc., Menlo Park, CA (US)

( * ) Notice: Subject to any disclaimer, the term of this patent is extended or adjusted under 35 U.S.C. 154(b) by 1312 days.

(21) Appl. No.: 10/099,487

(22) Filed: Mar. 15, 2002

(65) Prior Publication Data

US 2003/0177438 A1 Sep. 18, 2003

(51) Int. Cl.
*H04B 17/00* (2006.01)
(52) U.S. Cl. .................. 375/224; 375/340; 370/333
(58) Field of Classification Search .................. 703/2; 375/224, 340, 228; 702/65; 359/238, 333; 398/160; 370/333
See application file for complete search history.

(56) References Cited

U.S. PATENT DOCUMENTS

| | | | | |
|---|---|---|---|---|
| 5,400,165 | A | * | 3/1995 | Gnauck et al. .............. 398/160 |
| 5,450,229 | A | * | 9/1995 | Wiesenfeld ................ 359/238 |
| 6,335,819 | B1 | * | 1/2002 | Cho et al. ................... 359/333 |
| 6,728,311 | B1 | * | 4/2004 | Waschura et al. ........... 375/224 |
| 2003/0097226 | A1 | * | 5/2003 | Waschura et al. ............. 702/65 |
| 2003/0174789 | A1 | * | 9/2003 | Waschura et al. ........... 375/340 |

OTHER PUBLICATIONS

Popovici, A.C. Fast measurement of bit error rate and error probability estimation in digital communications systems, IEEE Global Telecomunications Conference, vol. 5, Nov. 1998, pp. 2736-2739.*
Kim et al., G. An 8-Gb/s optical backplane bus based on microchannel interconnects: design, fabrication, and performance measurements, IEEE, Journal of Lightwave Technology, vol. 18, No. 11, Nov. 2000, pp. 1477-1486.*
Seo et al., J.-S. performance of convolutional coded SQAM in hardlimited satellite channels, IEEE Int. Conference on Communications, BOSTONNICC/89, Jun. 1989, pp. 787-791.*
Ahn et al., K.H. System performance measurements for an all-optical header processor using 100-Gb/s packets, IEEE Photonics Technology Letters, vol. 11, No. 1, Jan. 1999, pp. 140-142.*

(Continued)

*Primary Examiner*—Russell Frejd
(74) *Attorney, Agent, or Firm*—Peninsula IP Group; Douglas Chaikin (57) ABSTRACT

Disclosed herein is a method that directs the components and signal detection path of a binary data bit decision mechanism used to obtain the bit error rate of the bit stream of an incoming or applied data signal to generate an eye diagram. More precisely, components such as the trigger-to-data delay adjustment to generate a delayed trigger pulse, the variable decision threshold setting, the bit detection flip flop in the input signal path to perform bit sampling, the total bits counter as a window size counter and the error counter to accumulate the occurrences when incoming signal exceeds a specified voltage threshold voltage range for a instance in time are used to implement the functionality required to generate the eye diagram.

30 Claims, 9 Drawing Sheets

OTHER PUBLICATIONS

Kruse et al., J. Scattering parameter and bit error rate characterization of high temperature superconducting coplanar transmission lines, IEEE Transactions on Appied Superconductivity, vol. 5, No. 4, Dec. 1995, pp. 3518-3521.*

Wenshan et al., C. Enhanced performance with optimized input power and increased dynamic range for wavelength conversion using four-wave mixing in SOAs, Optics Communications, vol. 193, Nos. 1-6, Jun. 2001, pp. 245-251.*

Megret et al., P. Theoretical and Experimental Study of the Bit-Error-Rate Through the Q Factors, Proceedings of Euorpean Conference on Networks and Optical Comunications, Jun. 1996, pp. 332-333.*

* cited by examiner

METHOD AND SYSTEM FOR CREATING AN EYE DIAGRAM USING A BINARY DATA BIT DECISION MECHANISM

BACKGROUND OF THE INVENTION

1. Field of the Invention

This invention relates to electronic systems that measures the performance of a high-speed data communications channel. More specifically, this invention relates to a method and system that combines the techniques of bit error rate detection with the functions used to create an eye diagram to accurately measure the performance of a high-speed data channel, device or system without the need of additional components.

2. Description of the Related Art

In recent years, the performance of a high-speed communication facility or device has risen to a point that the ability of accurately measure its throughput has become an ever increasing challenge. In the area of data communication devices, for example, efforts to reduce size and power, while increasing the throughput of a device have increased the possibility of error. Network suppliers, integrators and users want assurances that these devices will perform reliably and can accommodate data transmission rates that routinely exceed several gigabits/second. Providing such assurance requires determining the effective error rate of either the data received by or data transmitted through a high speed communications channel or device.

One approach of evaluating the performance of a high speed communications channel device or system is to use a BERT (BERT). Here, a predetermined bit pattern is transmitted through the target channel, device or system and on to BERT. The difference between the transmitted bit pattern and the bit stream generated by the target device or system are considered errors and are accumulated by the BERT to determine the effective bit error rate (i.e., the fraction of the received bits that are in error) of the target device or system. Even though bit error rate testing (BER) is a relatively significant measure of performance, merely measuring the error rate of a high speed communications device or system does not provide enough data to characterize the behavior or determine an acceptable bit error rate of a communications channel, device or system under a number of test conditions. Furthermore, measuring the bit error rate of a high speed communications device or system provides no warning as to when a slight degradation in the performance or throughput of a device or system might occur. More precisely, bit error rate measurements provide only an indication of any particular performance degradation after it has occurred. Of course, at that point the user would have already become aware of the performance degradation.

For these reasons, eye diagrams are used in analyzing the behavior and performance characteristics of a high-speed communications channel, channel or system during the various stages of development, manufacture and installation. One approach utilizing an eye diagram includes a sampling oscilloscope to generate a voltage-versus-time plot of a repetitive waveform and displays the results in the form of an eye diagram. Here, the data signal transmitted by the high speed communications channel, device or system and a clocking pulse or trigger synchronized to that of the bit stream of the applied data signal is supplied to the oscilloscope. Samples of the voltage of the applied data signal are then taken at various instances in time with respect to the trigger and plotted as events on the display of the oscilloscope. Voltage samples are continuously taken and added in combination with the older sampled events that have already been displayed. Over a relatively short period of time, a plurality of events is displayed on the oscilloscope showing the possible voltage distribution of the applied data signal. By accumulating the sampled events for all instances in time and for a specified voltage range, an eye diagram is drawn depicting the behavior and performance characteristics of a high-speed communications channel or device.

The problem with using devices such as a sampling oscilloscope to measure the performance characteristics of a high-speed communication device or system is that as the data rate of the transmitted signal increases, the bandwidth of the sampling oscilloscopes required to analyze these signals and generate an eye diagram must increase proportionally which, in turn increases the cost and sophistication of such oscilloscope. In addition, one or more of the methods to sample the bit stream of an incoming data signal only accumulates a relatively small number of samples per second allowing many, many edges of the trigger pulse to go by between taking samples thereby limiting the sampling rate to between one hundred thousand and two hundred thousand samples per second.

To overcome these limitations, it is a common practice to use a BERT in conjunction with a more sophisticated sampling oscilloscope. Using this configuration, an eye diagram can be generated and displayed on the oscilloscope at the same time as the error rate of a target device or system is measured by the BERT. Thus, by incorporating the functionality of generating an eye diagram into the testing process, a quicker and a more accurate measure of the behavior and performance of a communication device or system can be made at any time while a bit error measurement is taking place. In addition, the above combination also provides the ability to easily spot design or manufacturing defects in more complex communication devices or systems that might not have been detected by just using a bit error rate testing process, alone. However, the disadvantage with this approach is the cost of these two highly sophisticated instruments as well as the duplication of components that perform similar functions to analyze the behavior and performance of a high-speed communication device or system.

Therefore, it is desirable to utilize the same components and signal detection path of binary data bit decision mechanism such as a BERT used to obtain the effective error rate of an incoming data signal to generate an eye diagram that accurately depicts the behavior and performance characteristics of a high-speed data channel, device or system.

SUMMARY OF THE INVENTION

A general object of the present invention is to provide a method of utilizing the same components and signal detection path of binary data bit decision mechanism such as used to obtain the effective error rate of a high speed communications facility or device to generate an eye diagram.

It is also an object of the present invention to provide a method and system for accurately measuring the performance of a high speed data communications channel, device or system by means of both bit error rate and eye diagram measurement techniques without the need of additional components that might introduce distortion and error in these measurements.

The above and other objects are attained by the method of generating an eye diagram that measures the behavior and performance of an applied multi-valued data signals, performed by using the functionality of a binary data bit decision mechanism to comprising the steps of specifying a series of column and row elements that define size of an array used in displaying eye diagram, creating an upper and lower voltage threshold wherein an incremental change in voltage is used to move between individual column elements of the array; generating a series of time segments, determining the type and configuration of a decision comparator wherein the decision comparator receives and compares voltage values of the applied signal with a set of known, supplied voltage threshold values, programming the functionality of the operative components and data path of the binary data bit decision circuit to measure the applied data signal and display its associated eye diagram and accumulating event counts for each row and column element of the array.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

As FIG. 2 shows the functional components required to support eye diagramming technology and functionality in accordance with the preferred embodiment of the present invention.

DETAILED DESCRIPTION OF THE INVENTION

The present invention will now be described in greater detail with reference to the accompanying drawings, in which the preferred embodiments of the invention are shown. The present invention may, however, be embodied in many different forms and should not be construed as limited to the embodiment set forth herein; rather these embodiments are provided so that this disclosure will be thorough and complete and will fully convey the invention to those skilled in the art.

For the purposes of clarity, a data signal from either a communications channel or device comprises a plurality of succeeding "1" and "0" where each "1" is a pulse transmitted at one voltage or optical power level and each "0" is a pulse transmitted at another voltage or optical power level. The communications facility or device that transmits the data signal determines the sequences of "1"s and "0"s or pulses to be transmitted. An array is a series of column and row elements (i.e. points), where each of these column and row elements comprise a plurality of accumulated data or "events" for a specific instances in time and voltage offset for a portion of an applied signal. The accumulated data or "events" are used to generate an eye diagram that displays the behavior and performance of a high-speed communications facility or device.

The invention will now be described illustrating the essential operative components or elements used to incorporate the eye diagramming technology and functionality into a binary data bit decision mechanism such as a BERT. The same components and signal detection path used to obtain the bit error rate of the bit stream of an incoming or applied data signal can be used to generate an eye diagram. More precisely, the functionality for generating an eye diagram can be implemented by using the trigger-to-data delay adjustment to generate a delayed trigger pulse, the variable decision threshold setting, the bit detection flip flop in the input signal path to perform bit sampling, the total bits counter as a window size counter and the error counter to accumulate the occurrences when incoming signal exceeds a specified voltage threshold voltage range for a instance in time.

As one of ordinarily skilled in the art will realize a binary data bit decision mechanism such as a BERT, typically, has a multi-comparative element or parallel channel decision comparator with a plurality of comparator elements, an array of bit sampling flip-flops that enable an equivalent number of event counters used to facilitate the bit error rate testing function and reduce the time required to accurately analyze an applied data signal. For this embodiment, those components in the figures that comprise a number of elements will be clearly referenced, as such but for the purposes of clarity, individual, single operative component will be used for the discussion.

Figure 1:
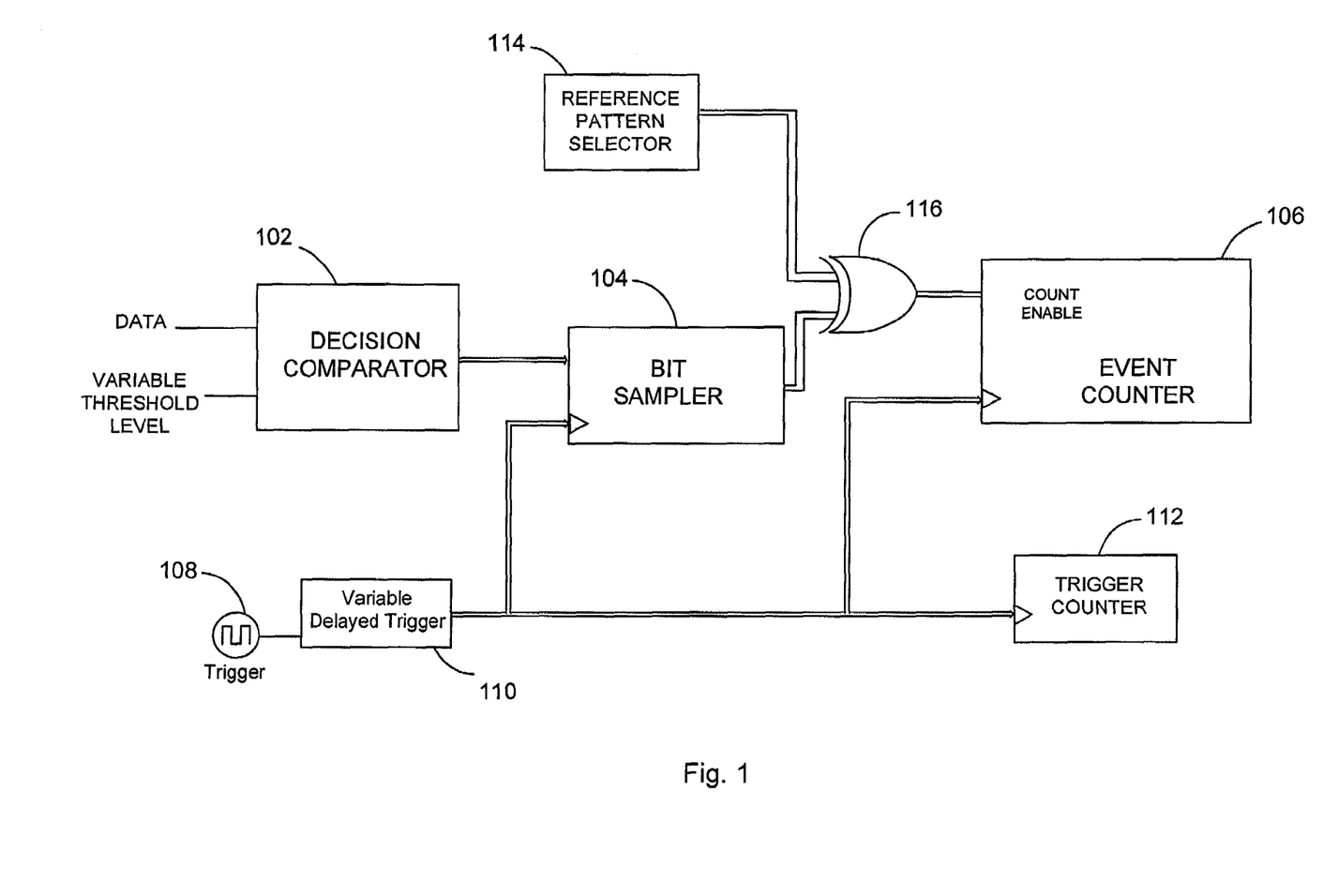
FIG. 1 illustrates the essential components or elements used to incorporate the eye diagramming technology and functionality into a binary data bit decision mechanism such as a BERT.

FIG. 1 is block diagram that shows the components of a binary data bit decision mechanism such as a BERT to implement the features and functionality of an eye diagram in accordance of the present invention. As FIG. 1 shows, the essential operative elements of a binary data bit decision mechanism such as a BERT includes a decision comparator 102, a variable delayed trigger 110, a sampling flip-flop 104 and an event counters 106. Here, the decision comparator 102 is a multi-element device that receives and compares the voltage level of an applied data signal to a prescribed threshold voltage. The decision comparator 102 produces and directs the resultant output to bit sampling flip-flop 104. In addition, a series of triggered pulses are also applied to the bit sampling flip-flip 104 from the variable delay trigger 110. In response to both the output from the decision comparator 102 and the triggered pulses from the variable delayed trigger 110, the bit sampling flip-flop 104 generates a sequence of bits indicating that the voltage level of the applied data signal has exceeded a threshold voltage for a specified instance in time. The output from the bit sampler 104 is then applied to an input pin of XOR gate 116 while the other input pin of XOR gate 116 is connected to a reference pattern selector 114. The reference pattern selector 114 provides a predetermined bit pattern that is combined with the output from the bit samplers 104 to determine if the applied data signal contains any errors. Therefore, any errors generated by XOR gate 116 are then directed to the event counter 106 that accumulate and record these "errors" as events.

To accumulate the data required to draw an eye diagram, the output from the bit sampler 104 is combined with the output pattern generated by the reference pattern selector 114 is forced to always be a logical "0", XOR gate 116 then generates a series of errors or mismatches. Thus, by forcing the reference pattern selector 114 to generate the same bit pattern all the time, it is equivalent to having the output of bit sampling flip-flop 104 directly interfaced to the count enable of event counter 106, as depicted in FIG. 2.

Figure 2:
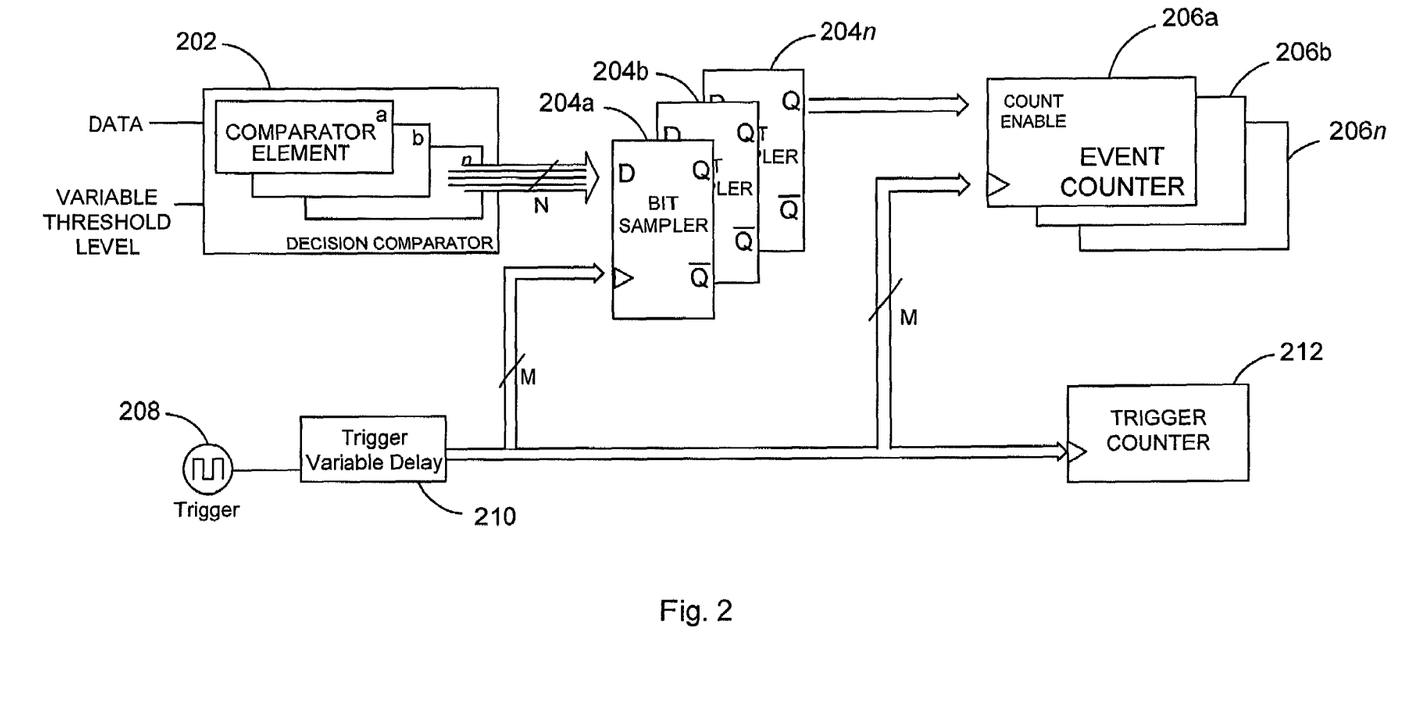

FIG. 2 shows the preferred embodiment of the present invention including a parallel channel decision comparator 202, a plurality of bit sampling flip-flops 204a–204n, and an array of event counters 206a–206n. The data comparator 202 can be configured as either a slice comparator that receives and compares the voltage level of an applied data signal against a particular voltage threshold ($V_T$) or a window comparator that determines if the voltage level of the applied data signal falls between a predetermined voltage range ($V_T$ and $V_T+\Delta V$). Each of the comparator elements of comparator 202 is configured to receive and compare the applied data signal for a specific voltage. Thus, the first decision comparator element 202(a) compares the voltage level of the applied data signal against an initial voltage threshold ($V_1$) equivalent to the voltage level $V_{min}$. While the next decision comparator element 202(b) compares the voltage level of the applied data signal against the initial voltage threshold ($V_1$) plus an incremental change in voltage ($\Delta$Voffset), where the change in voltage ($\Delta$Voffset) is determined by dividing the value of the specified voltage range ($V_{min}$ to $V_{max}$) by the number of decision comparator elements. For example, if decision comparator 202 had four decision comparator elements. Then, the value of the incremental change in voltage would be equivalent to one-quarter of the specified voltage range ($V_{min}$ to $V_{max}$).

When the voltage level of the applied data signal either exceeds a specified threshold voltage ($V_T$) or falls between a predetermined voltage range ($V_T$ and $V_T+\Delta V_T$), the successful comparative output from comparator 202 then sets each of the bit sampling flip-flops 204a–204n that, in turn, increments one of the event counters 206a–206n at the rising edge of each trigger pulse. In addition, trigger counter 212 counts the number of trigger pulses until a specified number of pulses have been received. Once a series of counts have been accumulated for a particular time and voltage level, they are then used as elements to generate a two dimensional eye diagram.

Figure 3:
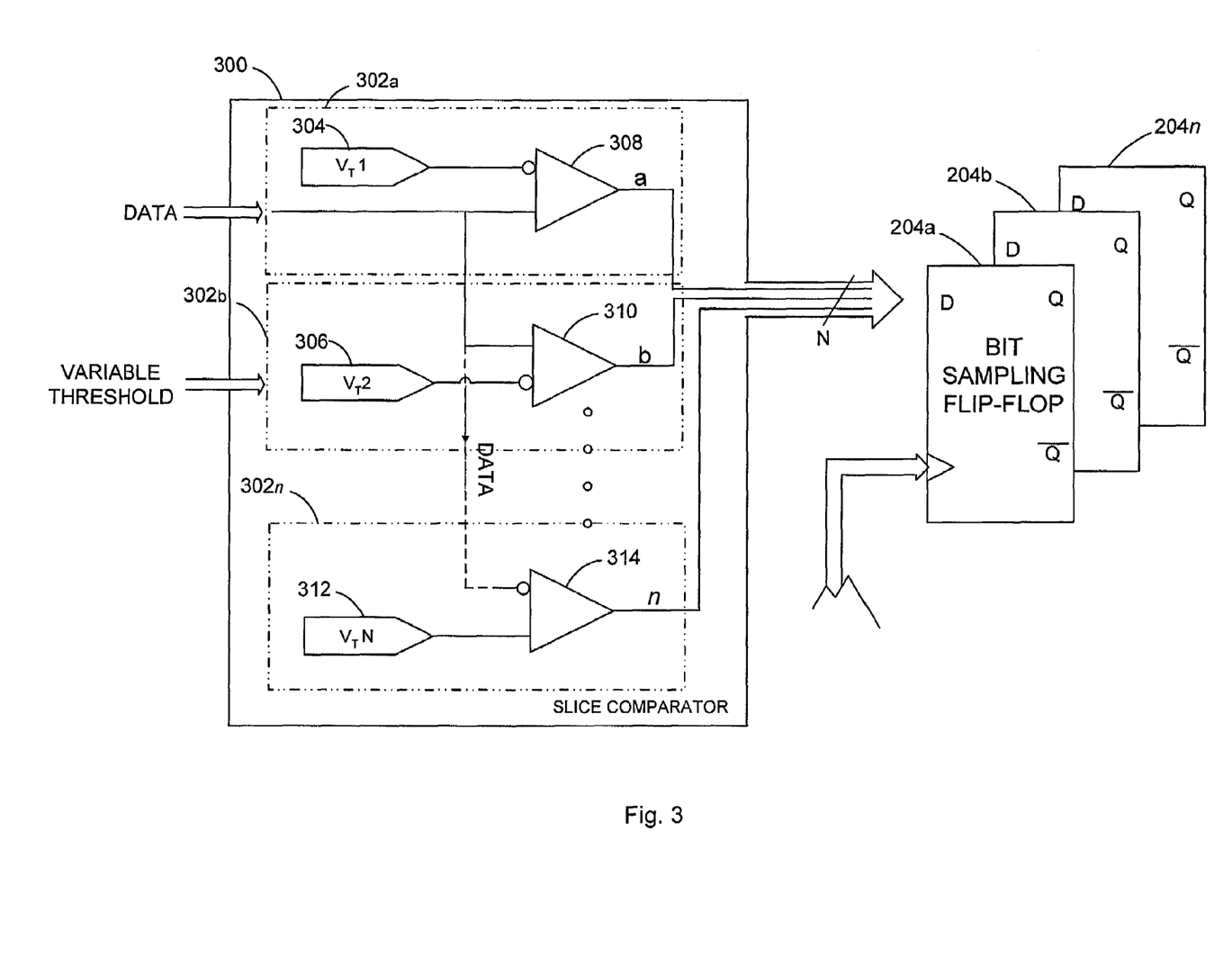
FIG. 3 is a block diagram illustrating a slice decision comparator, in further detail, as implemented in accordance with the present invention.

FIG. 3 is a block diagram that illustrates a generic parallel channel slice comparator comprising a plurality of decision comparator elements 302a–302n. As FIG. 3 shows the voltage level of the applied data signal is applied to the positive input pin while a specified threshold voltage ($V_T1$ to $V_TN$) is supplied the negative input pin. It should be noted that a single channel slice comparator could be used to compare the voltage level of an applied data signal to a single threshold voltage, as well. As FIG. 3 shows, each decision comparator element 302a–302n compares the voltage level ($V_s$) of the applied data signal with the supplied threshold voltage ($V_T$). If the voltage level ($V_s$) is higher that that of the threshold voltage ($V_T$), the output from that decision comparator goes high and sets one of the bit sampling flip-flops 204a–204n that, in turn, enables one of the event counters 204a–204n (as shown in FIG. 2). As before, the event counter will increment at the rising edge of each trigger pulse and accumulates the sampled bit stream as "events" for a particular time and voltage level.

Figure 4:
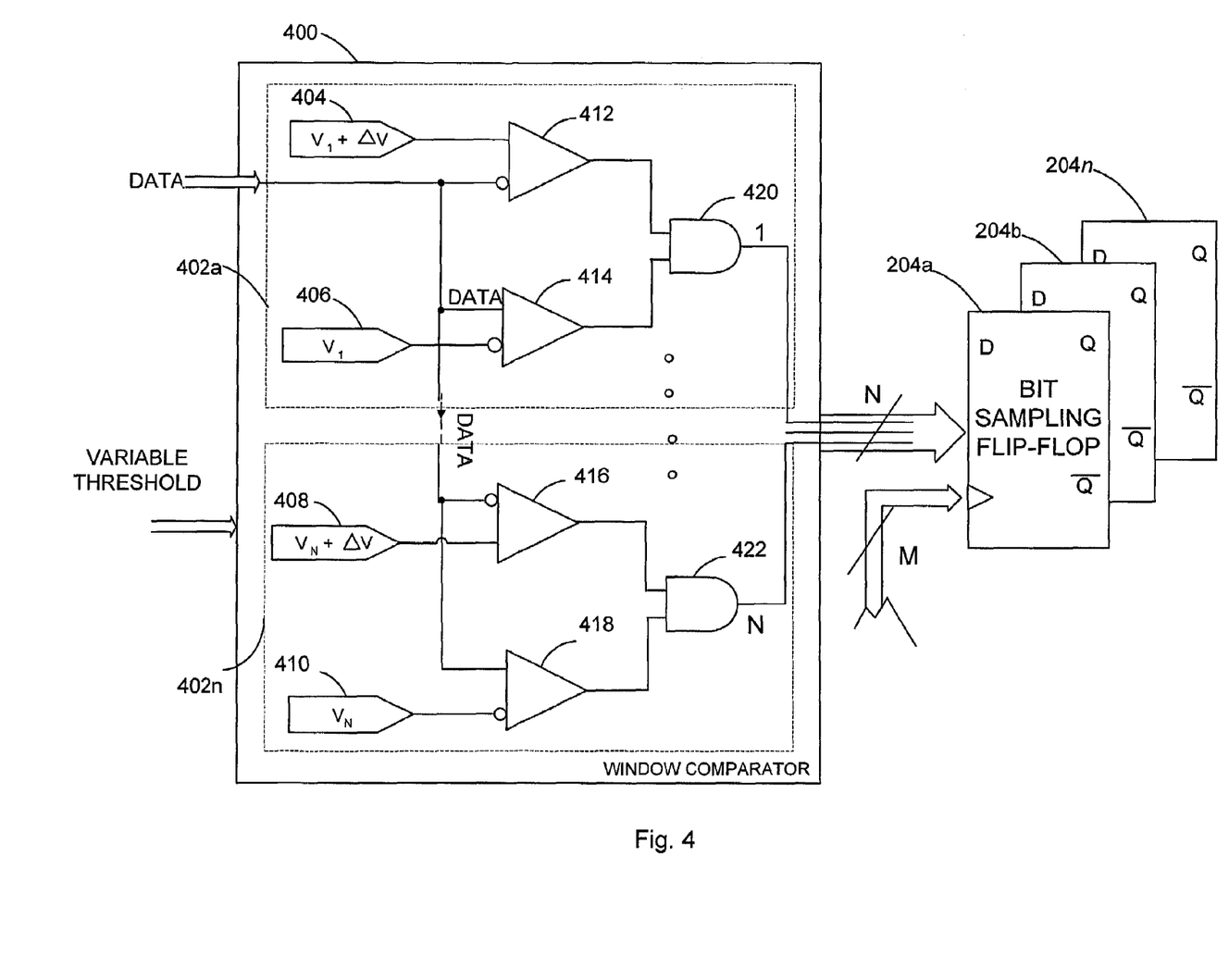
FIG. 4 is a block diagram illustrating a window decision comparator, in further detail, as implemented in accordance with the present invention.

FIG. 4 is a block diagram illustrating a parallel channel window decision comparator, in further detail, in accordance with the present invention. FIG. 4 shows the window comparator 400 consisting of a plurality of comparator elements 402a–402n connected, via interface, to an array of bit sampling flip-flops 204a-204n. As FIG. 4 depicts, each decision comparator element 402a–402n receives the voltage level of the applied data signal as well as a specified threshold voltage ($V_T$) and a window size ($\Delta V$). Here, the window size ($\Delta V$) is derived from subtracting the minimum voltage ($V_{min}$) from the maximum voltage value ($V_{max}$) of applied signal and dividing it by the maximum number of rows of the array. Unlike the slice comparator, each decision comparator 402a–402n of window comparator 400 compares the voltage level of the applied data signal for a separate and distinct voltage range ($V_T$ to $V_T+\Delta V$) for a particular instance in time and voltage offset.

Reference is now made to decision comparator element 402a of FIG. 4 that includes a pair of comparators 412, 414 whose output pins are connected to AND gate 420. For the purpose of clarity, the remaining discussion is directed towards decision comparator element 402a and bit sampling flip-flop 204a. As FIG. 4 shows, the value of threshold voltage ($V_1+\Delta V$) 404 is applied to the plus input pin of comparator 412 while threshold ($V_1$) 406 is applied to the minus input pin of comparator 414. In addition, the voltage level of the applied signal is applied to the plus input pin of comparator 414 and the minus input pin of comparator 412, as well. Thus, when the voltage level of the applied data signal is above threshold voltage ($V_1$) 406 but below threshold voltage ($V_1+\Delta V$) 404, the output produced by AND gate 420 is a logical "1" that sets bit sampling flip-flop 204a. As before, the events counter also increments as well as accumulates the sampled bit stream as "events" for a particular time and voltage level. The "events" depict the number of times the voltage level of the applied data signal falls between a given threshold voltage range at a specified instance in time as defined by the trigger edge. Each "count" accumulated by the event counter 110 is recorded for the appropriate row and column corresponding to a $\Delta V$ and time offset. Once the specified number of triggers pulses for that segment of the applied data signal has been reached, the "event count sequence" is repeated and then recorded for the next column and row in the array. Although, the "event count sequence" started at column 1 and row 1, it is understood that the "event count sequence" can start at any point in the array and in any order, as long as all column and row are eventually filled.

Figure 5:
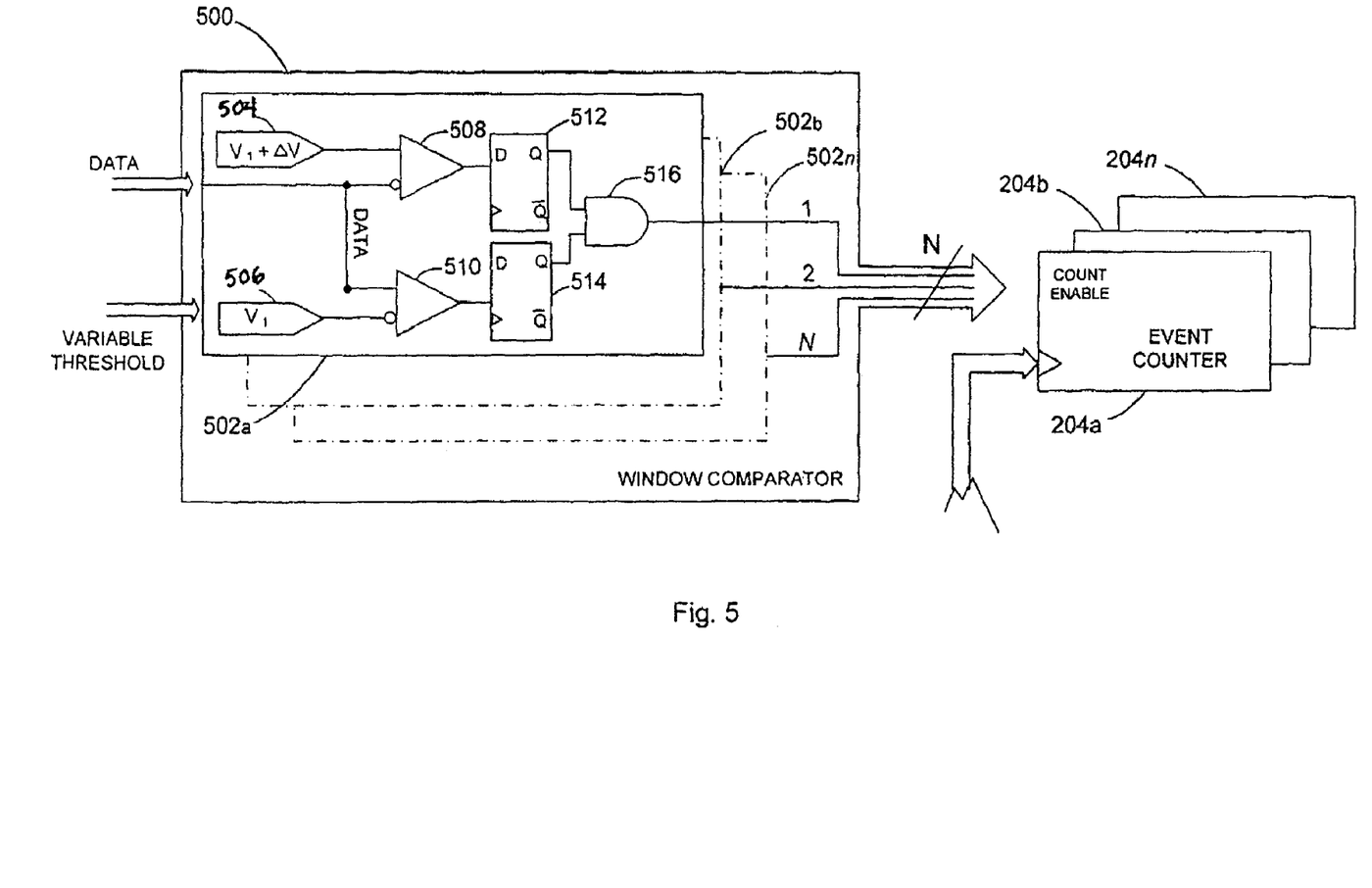
FIG. 5 is a block diagram illustrating an alternative embodiment of a window decision comparator as implemented in accordance with the present invention.

FIG. 5 is an exemplary alternative embodiment of a parallel channel window comparator in accordance with the present invention. As FIG. 5 shows the window decision comparator 500 consisting of a plurality of comparator elements 502a–502n connected, via interface, to an array of event counters 204a–204n. Here, each decision comparator element 502a–502n receives the voltage level of the applied data signal as well as a specified threshold voltage ($V_T$) and a window size ($\Delta V$). Like the first embodiment of the window comparator shown in FIG. 4, the threshold voltage ($V_T$) used by each decision comparator element 502a–502n is a voltage range having a minimum threshold voltage ($V_T$) to a maximum threshold voltage ($V_T+\Delta V$). Thus, each decision comparator 502a–502n compares the voltage level of the applied data signal for a separate and distinct voltage range ($V_T$ to $V_T+\Delta V$) for a particular instance in time and voltage offset.

Once again, for the purposes of clarity, this discussion is directed towards decision comparator element 502a and bit sampling flip-flop 204a. As FIG. 5 shows, the value of threshold voltage ($V_1+\Delta V$) 504 is applied to the plus input pin of comparator 508 while threshold ($V_1$) 506 is applied to the minus input pin of comparator 510. In addition, the voltage level of the applied signal is applied to the minus input pin of comparator 508 and the plus input pin of comparator 412, as well. Thus, when the voltage level of the applied data signal is above threshold voltage ($V_1$) 506 but below threshold voltage ($V_1+\Delta V$) 504, the output from comparator 510 sets flip-flop 514. The resultant outputs from each of the flip-flops 512, 514 are directed to AND gate 516. The signals from flip-flops 512, 514 are "ANDED" by AND gate 516 and are then directed to the event counter 204a. Thus, when the output signal from AND gate 516 is high, indicating that the voltage level of the applied data signal is between the threshold voltage values $V_1$ and $V+\Delta V$, the event counter accumulates the event but if the signal is low, nothing is accumulated.

Figure 6:
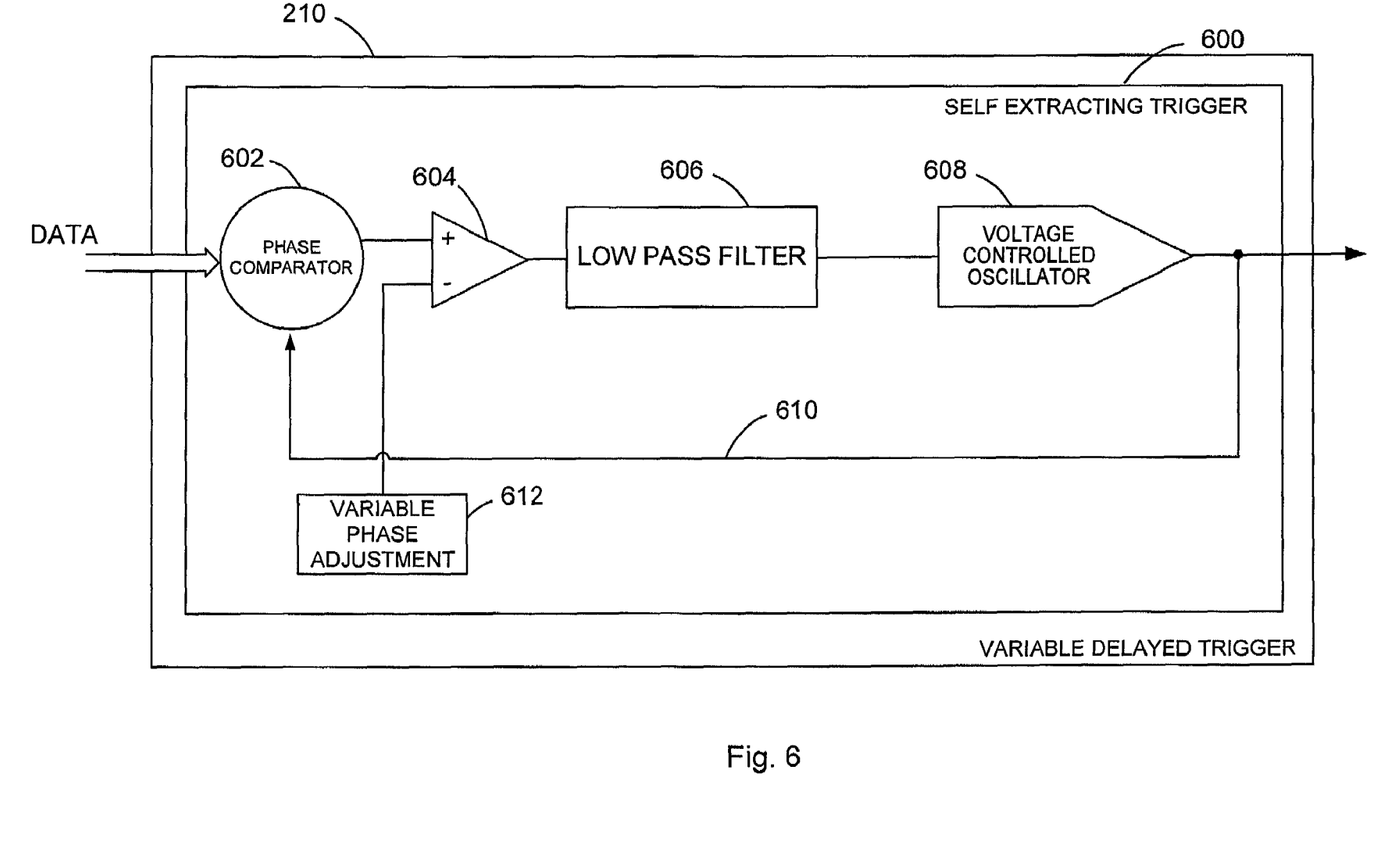
FIG. 6 is a schematic diagram of a variable delay trigger used in accordance with the present invention.

FIG. 6 is a schematic diagram of a variable delay trigger used in accordance with the present invention. As FIG. 6 shows the variable delay trigger 210 that is self-extracting trigger mechanism 600 designed to extract clocking or trigger pulses from an applied data signal. The self-extracting trigger mechanism 600 includes a phase comparator 602, an operation amplifier 604, low pass filter 606, voltage-controlled oscillator 608 and a variable phase control 612. The phase comparer compares the phase of the incoming bit stream with that of prescribed trigger pulse. The output from the phase comparator 602 as well as a specified voltage from the variable phase adjustment is directed to the operational amplifier 604. The result is then passed to the low pass filter 606 that eliminates any signal inconsistencies. If there is a difference in phase, the voltage-controlled oscillator 608 provides enough of an additional input, as feedback, to the phase comparator 602 to align leading edge of the pulse from the applied signal with the leading edge of the trigger pulse. But by applying a specified voltage from a programmable source like the variable phase controller 612, the phase of the trigger can be adjusted to suit the requirements of a user-specified application by means the variable phase controller 612.

Figure 7A:
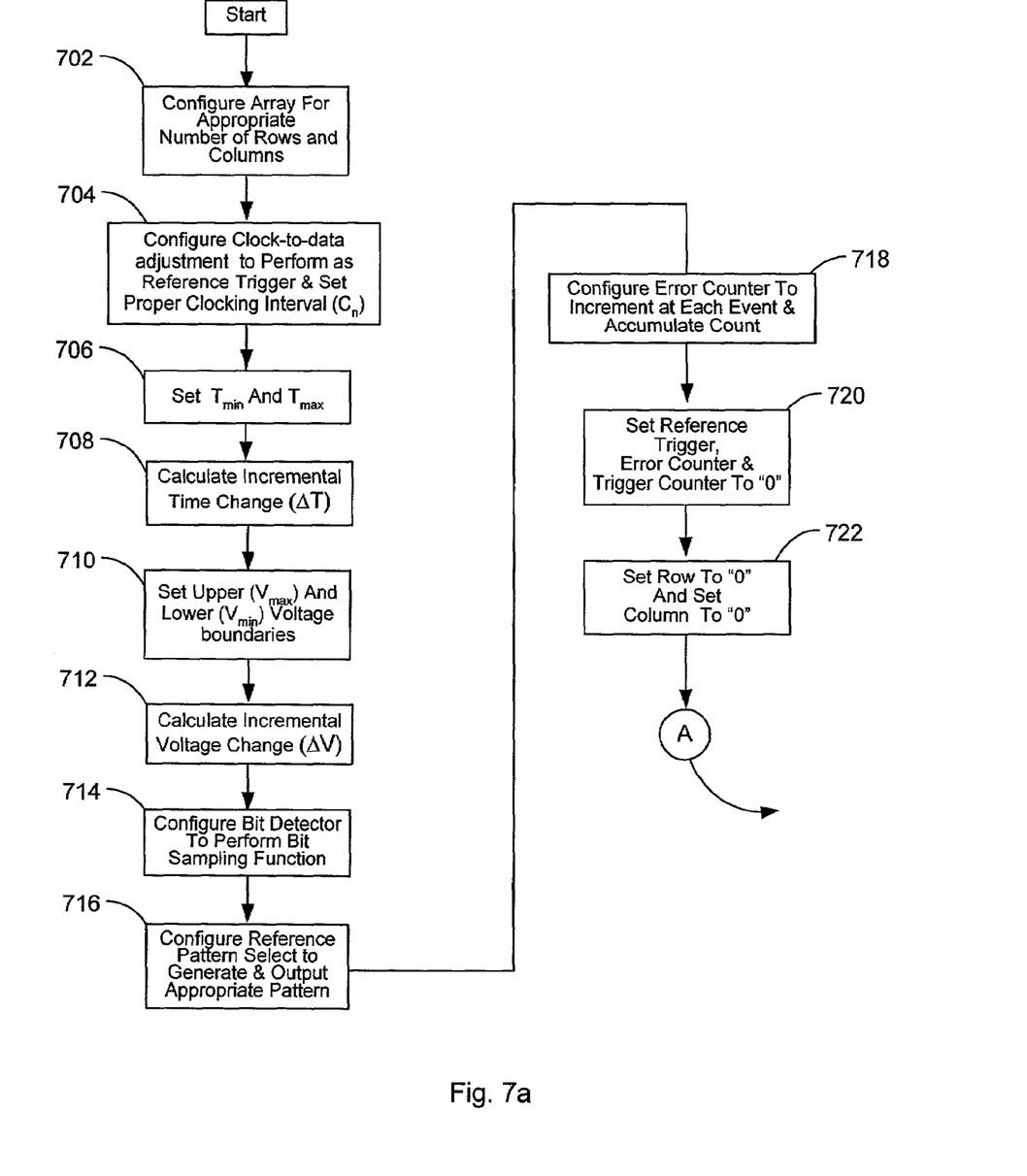
FIGS. 7a–c a flowchart that illustrates a method for accumulating event counts and generating an eye diagram using a BERT as depicted in FIG. 2.

FIG. 7 is a flowchart that illustrates a method for accumulating event counts and generating an eye diagram using a binary data bit decision mechanism in accordance with FIG. 2. The steps in the flowchart are simply illustrative of the functional steps performed by a binary data bit decision mechanism such as a BERT to generate an array of "event" counts at various instances in time and voltage offsets to generate an eye diagram. As FIG. 7a shows, at step 702, the array is configured with the appropriate number of rows and columns that meets the requirement of a particular application or set of user specified attributes. The trigger-to-data delay is configured as a trigger reference and generates the required trigger function or interval. At steps 704 and 710, time ($T_{min}$ and $T_{max}$) and voltage boundaries ($V_{min}$ and $V_{max}$) required to present either a portion or a complete representation of the applied data signal are specified, as well. In addition, the incremental time change ($\Delta T$), at step 708, and the incremental voltage change ($\Delta V$), at step 712, are calculated. Once the boundaries of the array have been defined, the operative components of the binary data bit decision mechanism are configured to perform the functions required to accumulate the data and generate an eye diagram of the applied data signal. Thus, at step 714, the bit detector flip-flop, the first input flip-flop in the input signal path, is programmed to perform the bit sampling function. If the binary data bit decision mechanism is a BERT, the reference pattern select, at step 716, is configured to always generate a logical "0" pattern Thus, by forcing the reference pattern selector to generate a bit pattern that is always logical "0", it is equivalent to having the output of bit sampling flip-flops be directly interfaced to the count enable of the event counter.

As FIG. 7a also shows, the error counter, at step 718, is configured as an event counter. At step 720, the reference trigger, event counter, and trigger counter are set to their initial minimum or initial values. At step 724, the program system determines if the decision comparator is either a slice comparator at step 726 or that the type and configuration used is a window comparator.

Figure 7B:
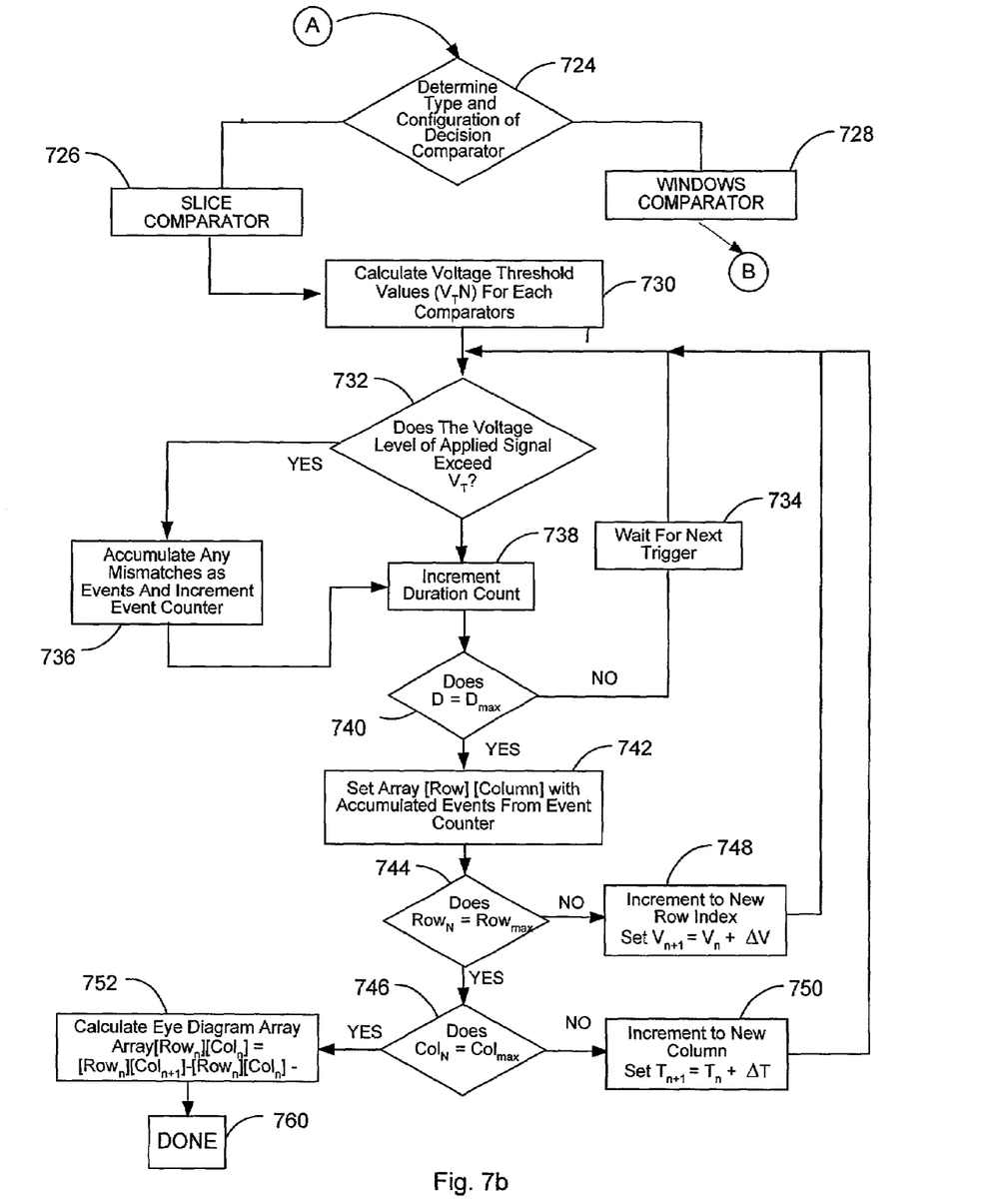

As FIG. 7b shows, if a slice decision comparator is chosen, at step 730 a voltage threshold is calculated and applied to the decision comparator. If, at step 732, the voltage level of the applied data signal exceeds the voltage threshold ($V_T$N) then it is considered an "event." The count of these "events" depicts the number of times the voltage of the applied data signal exceeds a threshold voltage. Step 736, increments the events counter and is accumulated for the appropriate row and column of the array. Also shown, at step 738, the duration count is incremented. If, at step 740, the duration is not equivalent to the maximum duration ($D_{max}$), the process, at step 734, waits for the next trigger to "fire." Once the reference trigger has "fired" the process of accumulating data for the applied data signal that includes steps 732–740 is repeated for the next duration of time. If $D_{max}$ has been reached, at step 740, the particular row and column in the array is set the value of events accumulated in the counter.

Also shown in FIG. 7b, if the value of array row index has not reached $Row_{MAX}$, at step 744, then at step 748 the array row index is incremented and a new voltage level is set. Then, steps 732 through 742 are repeated to accumulate event counts for the new row element at a new voltage level in that column ($Col_n$). If the value of the array row index in a column has reached $Row_{MAX}$, but the value of the array column index ($Col_n$) has not reached $Col_{max}$, the array column index, at step 750, is incremented to the next array column index ($Col_{n+1}$) and to the first row element ($R_0$) in that column (i.e. $R_0$, $Col_{n+1}$) and at steps 732 through 742 are repeated to accumulate data for each row of the next column. If the array row index is equal to $Row_{MAX}$ and the array column index is equal to $Col_{max}$, then the process of accumulating data of the applied data signal is complete. At step 752, the event counts used to draw an eye diagram are then calculated. Thus, when event counts have been calculated for each array row and column, a two-dimensional histogram of the applied data signal can be displayed as an eye diagram defining characteristics, behavior and performance of a high-speed data communications channel or device.

If a window comparator is identified, at step 724, the voltage thresholds is calculated, at step 762, that includes a lower voltage threshold value ($V_T$) and an upper voltage threshold values ($V_T+\Delta V$). If the voltage level of the applied data signal falls between both upper voltage threshold values ($V_T+\Delta V$) and the lower voltage threshold value ($V_T$) the result is then passed through the bit sampling flip-flop to the event counter. These resultant output are considered "events" indicating the number of times the voltage of the applied data signal fell between voltage range or window for a specified duration of time. Each "event", at step 768, increments the events counter and is accumulated for the appropriate row index and column index of the array.

Figure 7C:
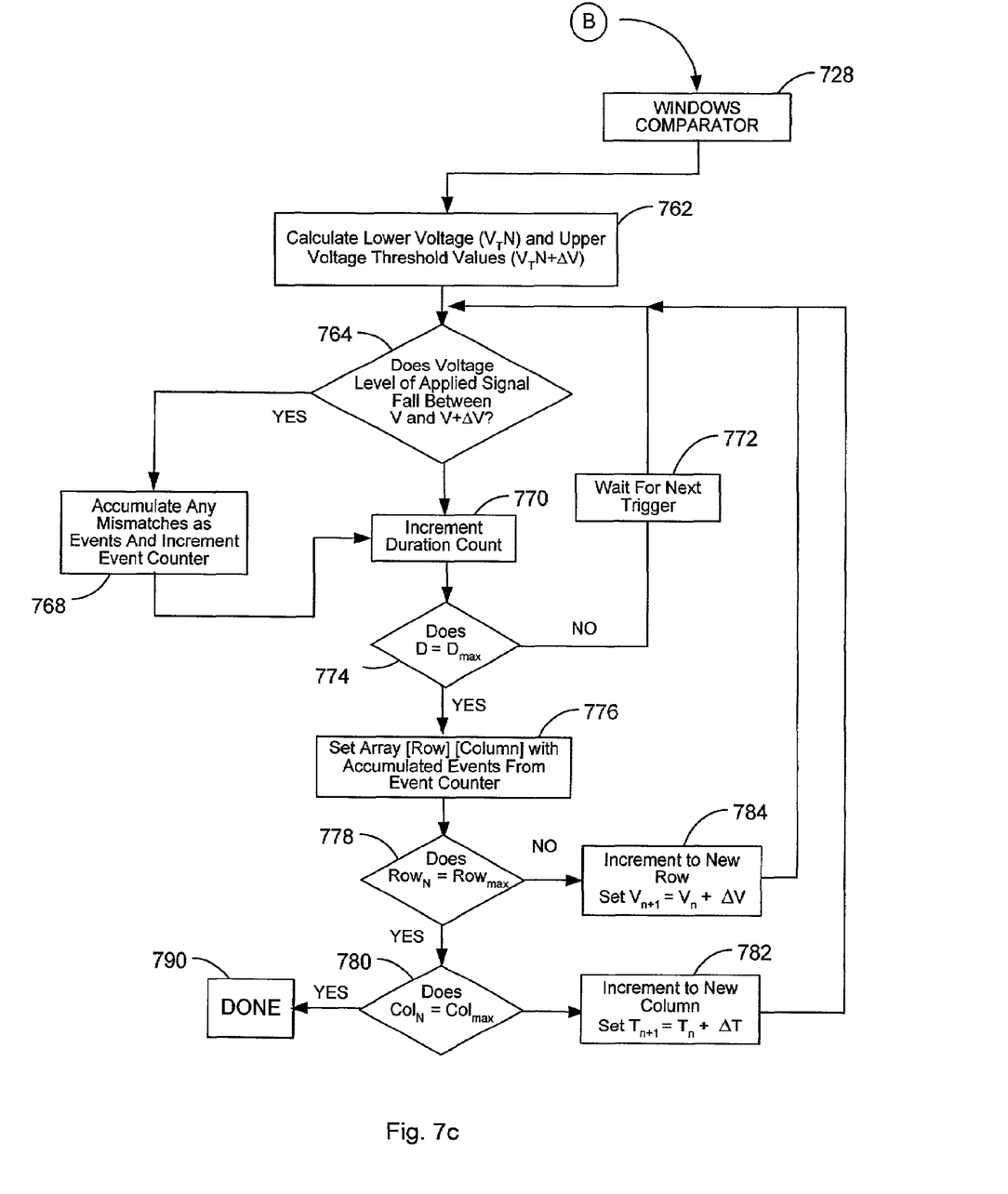

As FIG. 7c, the duration count, at step 770 is incremented and if, at step 774, the duration does not equal the maximum duration ($D_{max}$), at step 772 waits for the next reference trigger to "fire." Once "fired", the process continues repeating steps 764 to 768 for the next duration of time. If $D_{max}$ has been reached, at step 778, the particular row and column in the array is set to display the value of events accumulated in the counter.

Also FIG. 7c shows that if the value of array row has not reached $Row_{MAX}$, at step 778, then at step 784 the array row index is incremented and setting a new voltage level is set. Steps 764 through 776 used to accumulate event counts are repeated for the new row element at a new voltage level in that column ($Col_n$). If the value of the array row index in a column has reached $Row_{MAX}$, but the value of the array column ($Col_n$) has not reached $Col_{max}$, the array column index, at step 782, is incremented to the next array column index ($Col_{n+1}$) and to the first row element ($R_0$) in that column (i.e. $R_0$, $Col_{n+1}$) and at steps 764 through 776 are repeated to accumulate data for each row of the next column. Thus, when all of the event counts have been accumulated for each array row and column, a two-dimensional histogram of the applied and measured data signal is displayed as an eye diagram defining characteristics, behavior and performance of a high-speed data communications channel or device.

Foregoing described embodiments of the invention are provided as illustrations and descriptions. Other variations and embodiments are possible in light of above teachings, and it is thus intended that the scope of invention not be limited by this Detailed Description, but rather by the following claims. In addition, numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

What is claimed is:

1. A computer-implemented method of generating an eye diagram that measures the behavior and performance of an applied multi-valued data signal, comprising the steps of:

using a binary data bit decision mechanism, specifying a series of column and row elements that define the size of an array used in the eye diagram of an applied data signal;

generating an upper and lower voltage threshold wherein an incremental change in voltage is used to move between individual row elements of the array, the incremental change of voltage is derived from subtracting the minimum voltage from the maximum specified voltage and dividing the sum by the number of rows in the array;

generating a series of time segments wherein an incremental change in time is used to move between individual column elements of the array;

configuring a decision comparator wherein the decision comparator receives and compares voltage values of the applied data signal with the upper and lower voltage threshold values;

incrementing an event counter when the voltage level of the applied data signal is between the upper and lower voltage threshold; and accumulating a plurality of event counts to generate an eye diagram depicting the performance and behavior of the applied data signal.

2. The method as recited in claim 1, wherein the incremental change of time is derived from subtracting the minimum time from the maximum specified time and dividing the difference by the number of columns in the array.

3. The method as recited in claim 2, wherein the circuitry further substracts the event count recorded for each voltage threshold plus one of a trigger pulse from the voltage threshold position of each trigger pulse and records the result of the difference between the row array entries in all columns result as an event count of a corresponding voltage threshold and time offset of the second eye data array and displaying the second eye data array as the eye diagram.

4. The method as recited in claim 1, wherein a bit detection flip-flop performs a bit sampling function.

5. The method as recited in claim 1, wherein a clock-to-data clocking mechanism generates a reference trigger that supplied a predetermined, consistent clocking pulse to other operative components.

6. The method as recited in claim 1, wherein a variable decision threshold setting is configured as a variable threshold mechanism to supply the required threshold voltage settings to a plurality of decision comparators.

7. The method as recited in claim 1, wherein a total bits counter is configured to operate as a trigger counter.

8. The method as recited in claim 1, wherein an error counter is configured to perform the function of an event counter operative to accumulate a plurality of sampled occurrences as events.

9. The method as recited in claim 1, wherein the decision comparator is a slice comparator, wherein the slice comparator compares the voltage level of the applied data signal with a predetermined threshold voltage ($V_T$).

10. The method as recited in claim 1, wherein the type and configuration of the decision comparator detected is a window comparator, wherein the window comparator compares the voltage level of the applied data signal with a predetermined threshold voltage range, the voltage range having a minimum threshold voltage ($V_T$) and a maximum threshold voltage ($V_T+\Delta V$).

11. The method as recited in claim 1, wherein determining the behavior and performance of the applied data signal is performed by a slice comparator further comprising the steps of:

receiving the applied data signal;

detecting the voltage level of the applied data signal for a particular a instance in time that falls between a voltage range having a prescribed minimum voltage and maximum voltage;

comparing the voltage level of the applied signal with a threshold voltage of at least one decision comparator wherein the voltage level falls between the prescribed minimum voltage and maximum voltage; and sampling pulse voltage levels in excess of voltage threshold levels during each of trigger pulses for a specified series of trigger pulses.

12. The method as recited in claim 11, wherein determining the behavior and performance of the applied data signal comprising the steps of generating a first eye data array wherein the event counts are recorded at array positions defined by at least one voltage threshold level separated by an incremental voltage change and at least one trigger pulse separated by an incremental change in time.

13. The method as recited in claim 11, wherein the processing step includes generating a second eye data array.

14. The method as recited in claim 11, wherein the processing step of subtracting the event count recorded for each voltage threshold plus one of a trigger pulse from the voltage threshold position of each trigger pulse and records the result of the difference between the row array entries in all columns result as an event count of a corresponding voltage threshold and time offset of the second eye data array and displaying the second eye data array as the eye diagram.

15. The method as recited in claim 11, further including the steps of:

subtracting the event count recorded for each voltage threshold plus one of the trigger pulse from the voltage threshold position of each trigger pulses and recording the result of the difference between the low array entries in all columns as an event count of a corresponding voltage threshold and time offset of the second eye data array and displaying the second eye data array as the eye diagram.

16. The method as recited in claim 1, wherein determining the behavior and performance of an applied data signal performed by a window comparator comprising the steps of:

receiving the applied data signal;

detecting the voltage level of the applied data signal for a particular instance in time that falls between a voltage having a prescribed minimum voltage and maximum voltage;

sampling voltage levels of a plurality of threshold voltage ranges for each defined duration of time and for a specified series of trigger pulses wherein each threshold voltage range has a minimum threshold voltage ($V_T$) and maximum threshold voltage ($V_T+\Delta V$);

accumulating subsequent samples that fall between the minimum threshold voltage ($V_T$) and maximum threshold voltage ($V_T+\Delta V$) as event counts for each defined duration of time; and processing the accumulated plurality of event counts to generate an eye diagram depicting the performance and behavior of the applied data signal.

17. The method as recited in claim 1, wherein the circuitry further generates a second eye data array.

18. A system for generating an eye diagram that measures the behavior and performance of an applied multi-valued data signal, comprising:

circuitry for specifying a series of column and row elements that define the size of an array used in displaying the eye diagram of the applied data signal;

circuitry for generating an upper and lower voltage threshold wherein an incremental change in voltage is used to move between individual row elements of the array;

circuitry for generating a series of time segments wherein an incremental change in time is used to move between individual column elements of the array;

circuitry for configuring a decision comparator wherein the decision comparator receives and compares voltage values of the applied data signal with the upper and lower voltage threshold values;

circuitry for incrementing an event counter when the voltage level of the applied data signal is between the upper and lower voltage threshold; and circuitry for accumulating event counts for each row and column element of the array to generate an eye diagram depicting the performance and behavior of the applied data signal.

19. The system as recited in claim 18, wherein the incremental change of voltage is derived from subtracting the minimum voltage from the maximum specified voltage and dividing the difference by the number of rows in the array.

20. The system as recited in claim 18, wherein the incremental change of time is derived from subtracting the minimum time from the maximum specified time and dividing the difference by the number of columns in the array.

21. The system as recited in claim 18, wherein a bit detection flip-flop performs a bit sampling function.

22. The system as recited in claim 18, wherein a clock-to-data clocking mechanism generates a reference trigger that supplies a predetermined, consistent clocking pulse to other operative components.

23. The system as recited in claim 18, wherein a variable decision threshold setting is configured as a variable threshold mechanism.

24. The system as recited in claim 18, wherein a total bits counter is configured to perform as a trigger counter.

25. The system as recited in claim 18, wherein an error counter is configured to perform the function of an event counter, operative to accumulate a plurality of sampled occurrences as events.

26. The system as recited in claim 18, wherein the decision comparator is a slice comparator, wherein the slice comparator compares the voltage level of the applied data signal with a predetermined threshold voltage ($V_T$).

27. The system as recited in claim 18, wherein the decision comparator is a window comparator, wherein the window comparator compares the voltage level of the applied data signal with a predetermined threshold voltage range, the voltage range having a minimum threshold voltage ($V_T$) to a maximum threshold voltage ($V_T+\Delta V$).

28. The system as recited in claim 18, wherein the the decision comparator further comprises:

circuitry for receiving the applied data signal;

circuitry for detecting the voltage level of the applied data signal for a particular instance in time that falls between a voltage having a prescribed minimum voltage and maximum voltage;

circuitry for comparing the voltage level of the applied data signal with a threshold voltage of at least one decision comparator, wherein the voltage level falls between the prescribed minimum voltage and maximum voltage;

circuitry for creating trigger pulses; and circuitry for sampling pulse voltage levels in excess of voltage threshold levels during each of the trigger pulses for a specified series of trigger pulses.

29. The system as recited in claim 28, wherein determining the behavior and performance of an applied data signal further comprises the steps of generating a first eye array wherein the event counts are recorded at array positions defined by at least one voltage threshold level separated by an incremental voltage change and at least one trigger pulse separated by an incremental change in time.

30. The system as recited in claim 18, wherein the the decision comparator further comprises a window comparator including:

circuitry for receiving the applied data signal;

circuitry for detecting the voltage level of the applied data signal for a particular instance in time that falls between a voltage having a prescribed minimum voltage and maximum voltage;

circuitry for sampling voltage levels of a plurality of threshold voltage ranges for each defined duration of time and for a specified series of trigger pulses wherein each threshold voltage range has a minimum threshold voltage ($V_T$) and maximum threshold voltage ($V_T+\Delta V$);

circuitry for accumulating subsequent samples that fall between the minimum threshold voltage ($V_T$) and maximum threshold voltage ($V_T+\Delta V$) as event counts for each defined duration of time; and circuitry for processing the accumulated event counts to generate an eye diagram depicting the performance and behavior of the applied data signal.

* * * * *